United States Patent [19]
Ayers et al.

[11] 3,750,127
[45] July 31, 1973

[54] METHOD AND MEANS FOR SENSING STRAIN WITH A PIEZOELECTRIC STRAIN SENSING ELEMENT

[75] Inventors: Weston D. Ayers, West Covina; Joseph G. Hirsch, Diamond Bar, both of Calif.

[73] Assignee: General Dynamics Corporation, Pomona, Calif.

[22] Filed: Oct. 28, 1971

[21] Appl. No.: 193,419

[52] U.S. Cl............ 340/261, 73/88.5 R, 174/110 R, 174/113 R, 310/8.5, 340/227 C, 340/258 D
[51] Int. Cl. ............................................ G08b 13/02
[58] Field of Search............ 340/421, 227 C, 258 R, 340/261; 310/8.5; 174/110 R, 110 PM, 113 R; 73/88.5 R

[56] References Cited
UNITED STATES PATENTS

| 2,787,784 | 4/1957 | Meryman et al............ 340/227 C X |
| 3,415,517 | 12/1968 | Krist ............................... 340/261 X |
| 3,438,021 | 4/1969 | Nelkin et al. ....................... 340/261 |

*Primary Examiner*—David L. Trafton
*Attorney*—Edward B. Johnson

[57] ABSTRACT

A piezoelectric strain sensing element is used in strain gage, in intrusion detector, or in thermal gradient detector systems to provide an electrical charge or signal proportional in amplitude and polarity to the strain transmitted to the sensing element.

12 Claims, 6 Drawing Figures

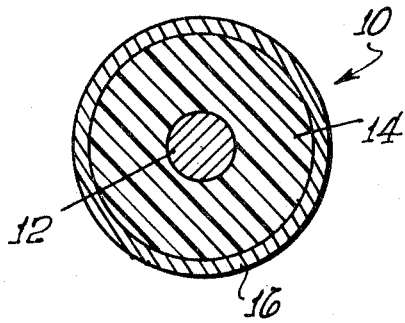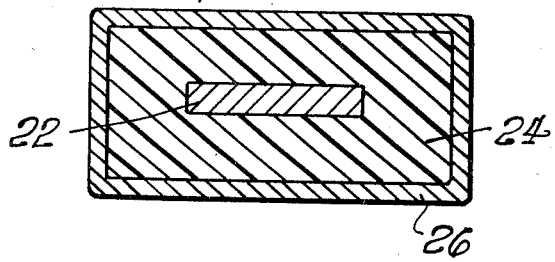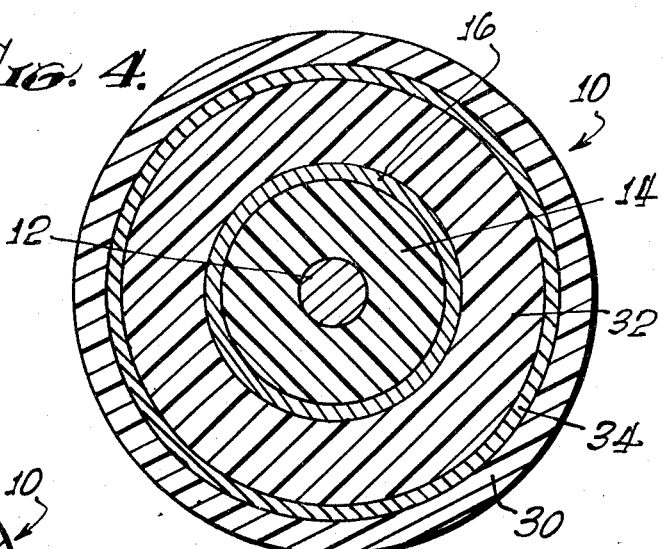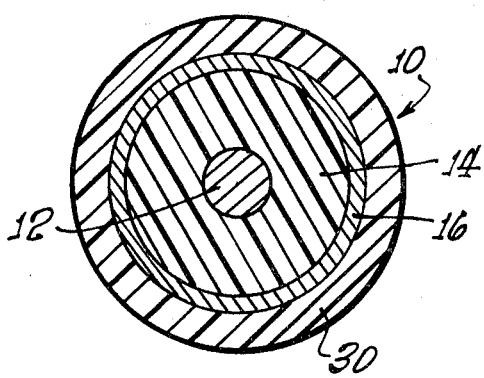

METHOD AND MEANS FOR SENSING STRAIN WITH A PIEZOELECTRIC STRAIN SENSING ELEMENT

BACKGROUND OF THE INVENTION

This invention is directed to utilization of the piezoelectric effects obtainable from sensing elements having dielectrics made of plastic materials which have been found to respond in the manner of piezoelectric generators when subjected to mechanical deformation or strain. Such sensing elements may be used in intrusion detector systems, in strain gage systems or in thermal gradient systems, for example.

Prior art strain gage sensing devices can be divided into two general categories:

1. Those that are rigidly attached to a surface where the strain is to be measured. By far the most common of this type is the resistance wire gage in which a fine metal wire or foil grid undergoes a change in resistance proportional to the strain change of the surface to which it is attached. Other types in this category would include the piezoresistive gage, and the photoelastic gage.

2. Those that sense the relative motion over a predetermined length between the item being strained and a rigid reference frame. The terms strain gage and extensiometer are used interchangeably in describing these devices. A variety of transducer principles are used, such as (a) mechanical amplification (b) linear variable differential transformer (c) optical array amplification and (d) optical contrast tracking.

Other measurement techniques such as optical interferometers, hexography, ultrasonic detection and various radio frequency systems are used as special setups to make strain measurements.

These gages, devices and techniques are in general designed for and used to measure a component of surface strain at a specific area of a structure. The size of the area varies from a few millionths of an inch for microscopic studies to a 1,000 inch long extensiometer employed in earthquake research. The vast majority of true strain gages fall in the 0.01 inch to 5.0 inches range. Compared to the size of natural and man made structures we might generalize by these gages as being designed for microstructural studies as opposed to macrostructural response studies.

Many of the advantages of existing strain gages become a disadvantage when an attempt is made to employ them in a macrostructural investigation. The advantage of being able to measure strain in a small area becomes a disadvantage in that a discontinuity such as a surface crack produces failure of the gage. The result is that, outside the laboratory, strain gages are of little value in measuring strains produced in the real world. An exception to this being in applications where laboratory criteria can be met.

Another prior art sensing device is an intrusion detector described in U.S. Pat. No. 2,787,784 which uses a coaxial type cable as an extended triboelectric transducer. The invention includes the new use of the inherently "noisy" coaxial type cable as the key element in a sensing device to detect the presence of persons, animals, vehicles and the like whenever the cable is disturbed or moved by same. Essential to the construction of the invention is the provision for a loose, frictional-fit between one or both conductors and the interposed insulating dielectric making up the major cable components. Accordingly, the triboelectric effect or "high noise" is produced by friction between the insulating dielectric and conductor or conductors upon the slightest displacement of the components of the cable. The triboelectric current generated by the friction is electrically connected to electronic circuits to provide a means for discerning that the cable components have been disturbed. It should be noted that the output of a triboelectric device always has the same polarity, or in other words, the polarity is not dependent upon direction of motion.

SUMMARY OF THE INVENTION

The invention is directed to a new type of sensing device functioning either as a strain gage, as an intrusion detector or as a thermal gradient detector, for example, which employs the principle of piezoelectricity in converting a mechanical strain or deformation to an electrical analog. More particularly, the device in its simplest form consists of a center conductor covered by a layer of sensing material which is in turn covered by an outer electrical conductor. The sensing material can be any of a number of electrically suitable sensing materials such as polytetrafluoroethylene that have been identified as piezoelectric generators. Additional elements such as an outer protective covering and electrical insulation surrounding the sensing material may be added to facilitate use but are not fundamental to the device. Operationally, a mechanical deformation or strain to be detected or measured is transmitted to the outer conductor which is characterized by a low mechanical spring constant so as to offer slight resistance to the deformation or strain as it is transmitted to the outer diameter of the sensing material. The inner diameter of the sensing material is partially restrained by the inner conductor, thereby generating a stress through the sensing element which produces an electrical charge proportional in amplitude and polarity to the product of the strain intensity and length so strained. This electrical charge is transformed to a usable electrical signal by suitable electrical and electronic circuit connections.

BRIEF DESCRIPTION OF THE DRAWINGS

FIG. 1 is a transverse sectional view, on an enlarged scale, of a piezoelectric sensing element used in the present invention.

FIG. 2 is a transverse sectional view illustrating a different shape for the type of sensing element shown in FIG. 1.

FIG. 3 is a transverse sectional view showing a modification of the FIG. 1 embodiment.

FIG. 4 is a transverse sectional view showing another modification of the FIG. 1 embodiment.

DESCRIPTION OF THE PREFERRED EMBODIMENTS

Figure 5:
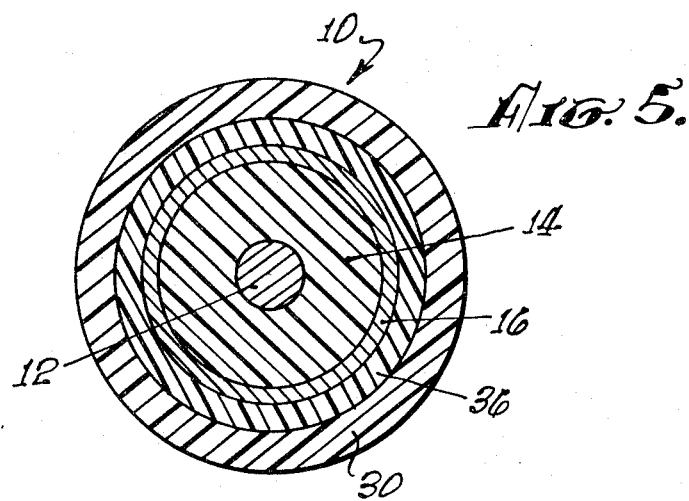
FIG. 5 is a transverse sectional view showing a further modification of the FIG. 1 embodiment.

Referring now to the drawings, and more particularly to FIG. 1, there is shown a sensitive flexible piezoelectric sensing element 10 which is adapted to produce an electrical charge proportional in amplitude and polarity to the amount of strain or deformation transmitted to the element. This element has an inner conductor 12 firmly covered by a layer of strain sensing material 14 which responds in the manner of a piezoelectric generator when the element 10 is subjected to deformation or strain. The sensing material 14 is covered by a shield or outer conductor 16. The outer conductor serves two functions: (1) as a return conductor in a circuit and as a shield to suppress unwanted electric or magnetic fields.

It should be understood that although mechanical deformation is discussed hereinafter, additional applications of the present invention encompass thermal gradient detection as well, as for example, a fire detector.

The FIG. 2 representation is illustrative of one of the different sensing element shapes available for use in the present invention. In FIG. 2 a sensitive piezoelectric sensing element 20 comprises a generally rectangular inner conductor 22 firmly covered by a substantially rectangular layer of piezoelectric strain sensing material 24 which in turn is covered by a generally rectangularly outer conductor or shield 26.

It will be readily appreciated by those skilled in the art that the piezoelectric sensing elements of the present invention and the components thereof may be constructed in a variety of ways as, for example, by laminations, continuous layers, twisting, weaving, etc., and the shapes may be round, square, rectangular, oval, and so forth. Suitable materials for the inner conductors, either solid or stranded types, for example, include bare copper, tinned copper, silver plated copper and silver plated cadmium copper or copper covered steel, tinned copper covered steel and silver plated copper covered steel. Suitable materials for the piezoelectric strain sensing elements include polyethylene, polytetrafluoroethylene, polyvinyl chloride, polyvinyl fluoride, polyvinylidine fluoride, polyethylene terephthalate and polypropylene. Suitable materials for the shields or outer conductors include bare copper, tinned copper, nickel plated copper, silver plated copper and silver plated copper covered steel. The outer conductors or shields are usually formed as a braided structure but they may be constructed as solid sheaths made of aluminum or copper covered with various types of plating. Metallic tape may also be used as an outer conductor.

In view of the many choices listed above, one preferred embodiment of a cable would comprise an inner conductor made of stranded silver plated copper covered steel, a sensing element made of polytetrafluoroethylene and an outer conductor made of braided silver plated copper.

In operation, a mechanical deformation or strain to be sensed by either element 10 or 20 is transmitted by whatever applicable means to the outer conductor of the piezoelectric sensitive element. The outer conductor has a low mechanical spring constant and offers but slight resistance therefor. The deformation or strain is transmitted through the outer conductor to the outer diameter of the piezoelectric sensing material. The inner diameter of the sensing material is partially restrained by the inner conductor thereby generating a stress through the sensing material. Since the sensing material is piezoelectric, it provides an electrical charge to the inner conductor which is proportional in amplitude and polarity to the product of the strain intensity and the length so strained. The electrical charge on the inner conductor is conducted to suitable electrical and electronic circuits for processing into a usable signal.

FIG. 3 shows a desirable modification to the sensing element 10 of FIG. 1, for example, in which a protective insulating jacket 30 is provided to cover the outer conductor 16 to protect the sensing element from the weather and rough treatment and to readily permit the element to be buried in water, earth and the like. Suitable materials for the protective insulating jacket include nylon, polyvinyl chloride, silicon rubber, neoprene, polytetrafluoroethylene tape and fluorinated ethylenepropylene. Addition of the protective insulating jacket 30 permits the element to be more normally used on or in the ground as part of an intrusion detector system, for example.

In the FIG. 4 modification to the sensing element 10, an additional layer of piezoelectric strain sensing material 32 followed by an additional outer conductor or shield 34 have been placed intermediate the outer conductor 16 and the jacket 30 to provide a sensing element with higher sensitivity. Obviously, more and varied layers of cable components are possible.

The sensing element 10 is further modified in FIG. 5 by placing a protective layer 36 between the outer conductor 16 and the jacket 30. The protective layer 36 may be made of polytetrafluoroethylene, for example, and its inclusion provides a ruggedized sensing element having excellent moisture-proofing and resistance to pinholes, nicks and the like. It can be appreciated that lack of such a protective layer under certain circumstances could easily result in reducing the effectiveness of a sensing element not so protected.

Figure 6:
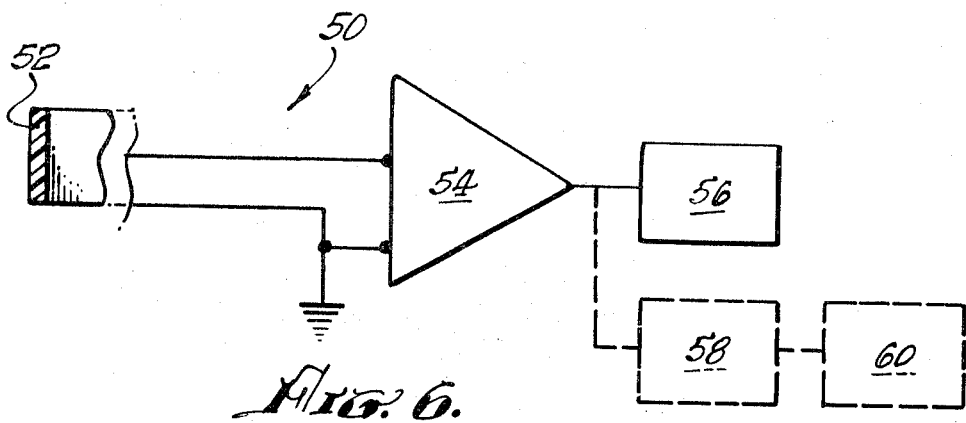
FIG. 6 is a simplified schematic representation, partly in fragmentary side elevation, illustrating an embodiment of a system for carrying out the invention.

Referring now to FIG. 6, there is shown a simplified schematic representation to illustrate the interconnection between a piezoelectric sensing element of the present invention and related electronic equipment suitable for use either in a thermal gradient detector system, in a strain gage system or in an intrusion detector system. In particular, a piezoelectric sensing element 50 having a moisture proof seal 52 on one end thereof is connected to an amplifier 54 which may be of the charge follower type or in some cases may be a voltage amplifier with a high input impedance. Amplifier 54 amplifies the electrical charge generated by the piezoelectric sensing element. A band pass filtering circuit (not shown) may be desirable to facilitate separation of wanted and unwanted signals. If the piezoelectric sensing element is being used in a strain gage system, the output of amplifier 54 may be connected to a suitable measuring instrument, to a tape recorder or to an oscilloscope, for example, as shown at 56 in FIG. 6. If the piezoelectric sensing element 50 is being used in an intrusion detector system, it may be preferable to connect the output of the amplifier 54 to a threshold detector circuit which provides a keying signal to an alarm device, for example, as shown at 58 and 60, respectively, in FIG. 6. All circuits would be powered by a suitable power supply source (not shown). In addition to revealing the presence of persons, animals and vehicles the output of such an intrusion detector may also be utilized to trigger a mine or a radio link, for example. Placement of the piezoelectric sensing element for an intrusion detector system is not limited to burying the element under the soil. The sensing element can also be attached to a fence or to a bridge, for example.

The active length of piezoelectric strain sensing element is established by the user from lengths less than one inch to lengths in excess of 100,000 inches, for example. An important feature of the present invention is that the active length of the sensing element can be made intermittent by splicing in a non-piezoelectric conductor section (or sections) where strain sensing is not desired. Means of attaching the strain sensing element can be by imbedding, clamping, adhesives or adhesive coated tape, for example. The sensing element is self-generating and it does not add heat or radiate electrical signals, and it is unaffected by varying magnetic fields.

Some typical uses for which the piezoelectric strain sensing element is uniquely suited are:

a. Measurement of low level elastic strains within non-homogeneous granular materials ranging from those in the earth produced by distant siesmic activity to those produced by passage of a pedestrian or an animal, b. Measurement of small dynamic strain levels in large structures such as bridges or high rise buildings, c. Strain produced in a fence or wall by someone climbing it, d. Strain in the floor of a building by movement and e. Vibrating strain in a machine or vehicle.

The advent of the flexible, continuous active length, piezoelectric strain sensing element introduces an entire new set of measurement possibilities. Earth strain profiles may in the future have a role for the public safety and civil engineering similar to that of the electroencephlagraph for the cardiac specialist. Crime prevention will be furthered when an entire building informs law enforcement officials of the presence of an intruder. Failure of an earthen dam, imminence of a land slide or of an earthquake, for example, are all preceded by earth strain discontinuities that may be employed to signal their impending occurrence. Detection and/or counting of the movement of man, beast or machine in proximity to a pre-determined zone can be accomplished through selective earth strain sensing with the piezoelectric sensing element. The deterioration of a road-bed or foundation does not occur without attendant changes in the earth strain transfer function. Seismographic studies emphasize the transfer of higher frequency waves due to the measurement limitation of geophones. The use of vertically or horizontally implanted piezoelectric strain sensing elements will open a new frequency domain to investigators.

What is claimed is:

1. Strain sensing apparatus comprising: a first conductor having a prescribed length; a second conductor having a prescribed length compatible with said first conductor substantially surrounding said first conductor in spaced relationship therewith; a layer of strain sensing piezoelectric material disposed intermediate and firmly engaging said conductors and extending therebetween so as to be capable of generating an electrical charge when subjected to strain; said electrical charge proportional in amplitude and polarity to the amount of strain transmitted to said strain sensing piezoelectric material; said strain sensing material comprising a material selected from the group consisting of polyethylene, polytetrafluoroethylene, polyvinyl chloride, polyvinyl fluoride, polyvinylidine fluoride, polyethylene terephthalate and polypropylene; and electronic means responsive to said electrical charge connected to said conductors for indicating the occurrence of strain.

2. The strain sensing apparatus defined in claim 1, wherein said first and second conductors and said strain sensing material are disposed in coaxial relationship.

3. The strain sensing apparatus defined in claim 1, additionally including an insulating jacket having a prescribed length substantially surrounding said second conductor.

4. The strain sensing apparatus defined in claim 3, additionally including a protective layer disposed intermediate and extending between said insulating jacket and said second conductor.

5. The strain sensing apparatus defined in claim 3, additionally including a third conductor having a prescribed length compatible with said second conductor substantially surrounding said second conductor in spaced relationship therewith, an additional layer of strain sensing piezoelectric material disposed intermediate said second and third conductors and extending therebetween, said third conductor and said additional layer of strain sensing piezoelectric material disposed intermediate said second conductor and said insulating jacket.

6. The strain sensing apparatus defined in claim 1, wherein said electronic means comprises amplifier means connected to said first conductor for amplifying said electric charge and strain indicating means connected to said amplifier means for indicating the occurrence of strain.

7. A strain sensing apparatus comprising: a first conductor having a prescribed length; a second conductor having a prescribed length compatible with said first conductor substantially surrounding said first conductor in spaced relationship therewith; strain sensing piezoelectric material disposed intermediate and firmly engaging said conductors and extending therebetween so as to be capable of generating an electrical charge when subjected to strain; said electrical charge proportional in amplitude and polarity to the amount of strain transmitted to said strain sensing piezoelectric material; an insulating jacket having a prescribed length substantially surrounding said second conductor; and electronic means responsive to said electrical charge connected to said conductors for indicating the occurrence of strain.

8. The strain sensing apparatus defined in claim 7, additionally including a protective layer disposed intermediate and extending between said insulating jacket and said second conductor.

9. In combination with an alarm system, a strain sensing piezoelectric device comprising: a first conductor having a prescribed length; a second conductor having a prescribed length compatible with said first conductor substantially surrounding said first conductor in spaced relationship therewith; and strain sensing piezoelectric material disposed intermediate and firmly engaging said conductors and extending therebetween so as to be capable of generating an electrical charge when subjected to strain; said electrical charge proportional in amplitude and polarity to the amount of strain transmitted to said strain sensing piezoelectric material.

10. The alarm system defined in claim 9, wherein said device additionally includes an insulating jacket having a prescribed length substantially surrounding said second conductor.

11. The alarm system defined in claim 10, wherein said device additionally includes a protective layer disposed intermediate and extending between said insulating jacket and said second conductor.

12. A piezoelectric device comprising:
a piezoelectric sensing element responsive to strain; said piezoelectric sensing element comprising a first conductor having a prescribed length, a second conductor having a prescribed length compatible with said first ocnductor substantially surrounding said first conductor in spaced relationship therewith, a layer of strain sensing piezoelectric material disposed intermediate and firmly engaging said conductors and extending therebetween to a prescribed length compatible with said conductors so as to be capable of generating an electrical charge when subjected to strain; said electrical charge porportional in amplitude and polarity to the amount of strain transmitted to said strain sensing piezoelectric material; said strain sensing material comprising material selected from the group consisting of polyethylene, polytetrafluoroethylene, polyvinyl chloride, polyvinyl fluoride, polyvinylidine fluoride, polyethylene terephthalate and polypropylene; and at least one conductor section electrically connected to said piezoelectric sensing element, said conductor section being non-responsive to strain.

* * * * *